US012422768B2

(12) United States Patent
Tamura et al.

(10) Patent No.: US 12,422,768 B2
(45) Date of Patent: Sep. 23, 2025

(54) IMAGE FORMING SYSTEM

(71) Applicant: CANON KABUSHIKI KAISHA, Tokyo (JP)

(72) Inventors: Shuichi Tamura, Ibaraki (JP); Naoyuki Yamamoto, Chiba (JP); Tohru Nakaegawa, Chiba (JP); Kenichiro Kitajima, Ibaraki (JP); Kota Mori, Chiba (JP); Yoshiro Tsukada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/240,440

(22) Filed: Aug. 31, 2023

(65) Prior Publication Data

US 2024/0085834 A1 Mar. 14, 2024

(30) Foreign Application Priority Data

Sep. 13, 2022 (JP) ................................ 2022-145108

(51) Int. Cl.
*G03G 15/20* (2006.01)
*G03G 15/00* (2006.01)

(52) U.S. Cl.
CPC ..... *G03G 15/2092* (2013.01); *G03G 15/6541* (2013.01); *G03G 2215/00227* (2013.01); *G03G 2215/00354* (2013.01)

(58) Field of Classification Search
CPC ........... G03G 15/2092; G03G 15/6541; G03G 2215/00227; G03G 2215/00354
See application file for complete search history.

(56) References Cited

U.S. PATENT DOCUMENTS 4,564,185 A * 1/1986 Hamlin ................... B42C 19/00 412/37
2005/0196203 A1* 9/2005 Tsuda ................... G03G 15/205 399/341
2007/0237559 A1* 10/2007 Sasamoto .......... G03G 15/6544 399/408
2007/0286705 A1* 12/2007 Sasamoto ............... B42C 11/02 412/13
2008/0174626 A1* 7/2008 Hirao ................. G03G 15/6552 347/16
2008/0174793 A1* 7/2008 Mutsuno .............. G03G 15/553 358/1.6

(Continued)

FOREIGN PATENT DOCUMENTS

EP 0691591 A1 * 1/1996
JP 2541939 B2 * 10/1996

(Continued)

*Primary Examiner* — Sevan A Aydin
(74) *Attorney, Agent, or Firm* — Venable LLP

(57) ABSTRACT

An image forming system includes an image forming apparatus including an image forming unit and a fixing unit; a folding processing portion; a pressure-bonding portion; and an input portion capable of selecting a pressure-bonding mode in which a pressure-bonding print prepared by subjecting the recording material to pressure-bonding processing by the folding processing portion and the pressure-bonding portion and capable of selecting a layout of the toner image formed on the recording material. When the pressure-bonding mode is selected, the layout depending on the pressure-bonding mode is selected.

18 Claims, 14 Drawing Sheets

(56) References Cited

U.S. PATENT DOCUMENTS

| | | | | |
|---|---|---|---|---|
| 2009/0051098 | A1* | 2/2009 | Toda | G03G 15/6582 270/37 |
| 2009/0190153 | A1* | 7/2009 | Nakanishi | H04N 1/00432 358/1.13 |
| 2015/0283842 | A1* | 10/2015 | Tachibana | B65H 7/20 270/37 |
| 2016/0313687 | A1* | 10/2016 | Osada | B42C 3/00 |
| 2017/0023898 | A1* | 1/2017 | Harano | B42C 19/02 |
| 2022/0134795 | A1 | 5/2022 | Tsukada et al. | |
| 2022/0137550 | A1* | 5/2022 | Ishii | G03G 21/1814 399/111 |
| 2023/0062516 | A1* | 3/2023 | Hatanaka | B42D 15/04 |
| 2023/0068570 | A1 | 3/2023 | Tamura et al. | |
| 2024/0190679 | A1* | 6/2024 | Kitajima | B65H 45/30 |
| 2024/0192626 | A1* | 6/2024 | Nakaegawa | G03G 15/6582 |
| 2024/0192627 | A1* | 6/2024 | Tsukada | B65H 45/142 |
| 2024/0192628 | A1* | 6/2024 | Mori | B65H 45/18 |

FOREIGN PATENT DOCUMENTS

| | | | | | |
|---|---|---|---|---|---|
| JP | H0944022 | A | * | 2/1997 | |
| JP | 2007193004 | A | * | 8/2007 | |
| JP | 2008162029 | A | * | 7/2008 | |
| JP | 2014-035454 | A | | 2/2014 | |
| JP | 2015-150792 | A | | 8/2015 | |
| JP | 2022-073597 | A | | 5/2022 | |
| WO | WO-9209937 | A1 | * | 6/1992 | B42D 15/02 |
| WO | WO-9718274 | A1 | * | 5/1997 | B32B 37/185 |

* cited by examiner

| | FOLDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | FEEDING DIRECTION | SET DIRECTION |
| E1 |  | FDLE |  | FD VF | FACE UP | PS : UP |
| E2 |  | FDTE | | | FACE DOWN | PS : DOWN |
| E3 |  | FDLE |  | FD MF | FACE UP | PS : DOWN |
| E4 |  | FDLE | | | FACE DOWN | PS : UP |

| | FOLDING PROCESSING APPARATUS | | | | IMAGE FORMING APPARATUS | |
|---|---|---|---|---|---|---|
| | FEEDING DIRECTION (FOLD POSITION) | | FOLDING DIRECTION | | FEEDING DIRECTION | SET DIRECTION |
| F1 | | FDLE | NPS PS | FD ZF | FACE UP | PS : UP |
| F2 | | FDTE | | | FACE DOWN | PS : DOWN |
| F3 | | FDLE | PS NPS | FD RZF | FACE UP | PS : DOWN |
| F4 | | FDTE | | | FACE DOWN | PS : UP |

FIG. 7

IMAGE FORMING SYSTEM

FIELD OF THE INVENTION AND RELATED ART

The present invention relates to an image forming system for preparing a pressure-bonding print by forming an image on a recording material, folding (bending) the recording material on which the image is formed, and pressure-bonding the recording material under application of heat and pressure to the folded recording material.

Conventionally, the image forming system for preparing the pressure-bonding print has been proposed (Japanese Laid-Open Patent Application (JP-A) 2014-35454). As the pressure-bonding print, it is possible to cite, for example, a pressure-bonding postcard such that opposing surfaces of a recording material folded in two (hereinafter, the opposing surfaces are referred to as pressure-bonding surfaces (sides)) are superposed and pseudo-bonded together. In the case of such pressure-bonding print, a user cannot read the toner image, such as a character or a picture, formed on the pressure-bonding surfaces until the pressure-bonding surfaces pseudo-bonded together are peeled off from each other. Here, pseudo-bonding refers to one form of bonding such that the recording material is peelable after the bonding and is not readily bonded again after the peeling. The pressure-bonding print is prepared by folding the recording material, on which a toner image is formed by the image forming apparatus, by a pressure-bonding processing apparatus which is one of post-step units which are retrofittable to the image forming apparatus in order to expand function.

Further, the image forming system includes a staple apparatus as the post-step unit in some instances. The staple apparatus performs stapling such that a plurality of recording materials are bundled and bound, and then discharges the bundle of the bound recording materials.

In a conventional image forming apparatus, a user is capable of setting a so-called layout change in which images corresponding to a plurality of pages are placed on one page of the recording material. As the layout change, it is possible to cite, for example, "2 in" in which toner images corresponding to 2 pages are formed on one page, "4 in 1" in which toner images corresponding to 4 pages are formed on one page, "8 in 1" in which toner images corresponding to 8 pages are formed on one page, and the like. Further, in the case where the image forming system includes the staple apparatus, the user is capable of setting execution or non-execution of the stapling.

However, when preparation of the pressure-bonding postcard is carried out in the case where the layout change is set, for example, the toner image originally formed on the pressure-bonding postcard so as not to be read externally was formed so as to be read externally in some instances with the layout change. Further, when the preparation of the pressure-bonding postcard was carried out in the case where the stapling was set, there was a liability that the bound recording materials were jammed in an intermediary portion of a feeding passage in the pressure-bonding processing apparatus.

SUMMARY OF THE INVENTION

According to an aspect of the present invention, there is provided an image forming system comprising: an image forming apparatus including an image forming unit configured to form a toner image on a recording material having a pressure-sensitive adhesive layer on a surface thereof and a fixing unit configured to fix the toner image on the recording material; a folding processing portion configured to fold the recording material, on which the toner image is fixed by the fixing unit, in a manner such that the surface where the pressure-sensitive adhesive layer is formed is an inside of the recording material; a pressure-bonding portion configured to pressure-bond the recording material folded by the folding process portion; and an input portion capable of selecting a pressure-bonding mode in which a pressure-bonding print prepared by subjecting the recording material to pressure-bonding processing by the folding processing portion and the pressure-bonding portion and capable of selecting a layout of the toner image formed on the recording material, wherein when the pressure-bonding mode is selected, the layout depending on the pressure-bonding mode is selected.

Further features of the present invention will become apparent from the following description of exemplary embodiments with reference to the attached drawings.

Figure 3:
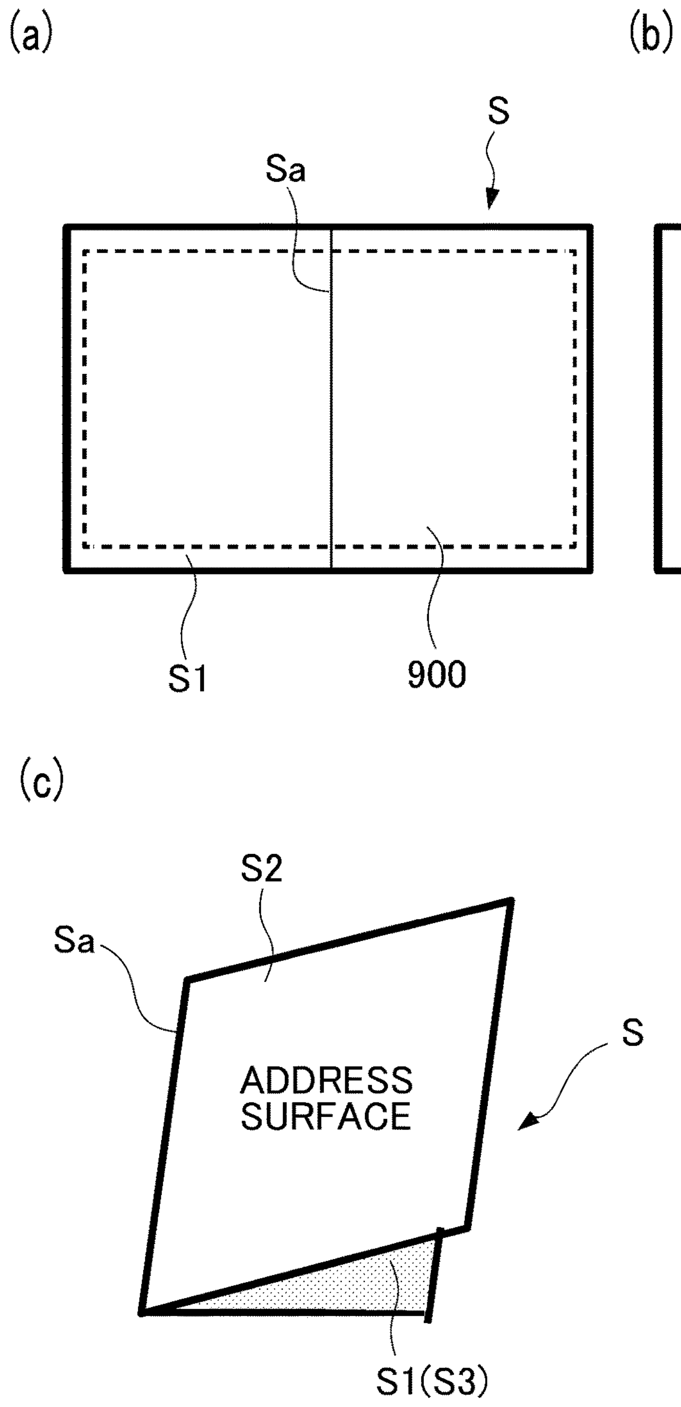

Parts (a), (b), and (c) of FIG. 3 are schematic views showing a two-fold pressure-bonding postcard, in which part (a) shows a first surface side, part (b) shows a second surface side, and part (c) shows a folded state.

Figure 4:
Figure 4:
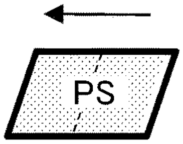
Figure 4:
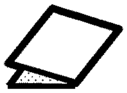
Figure 4:
Figure 4:
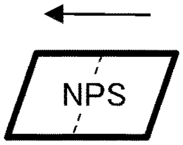
Figure 4:

FIG. 4 is a schematic view showing combinations of set directions, feeding directions, and folding directions of pressure-bonding postcard sheets capable of appropriately preparing pressure-bonding postcards by two-folding.

Figure 5:
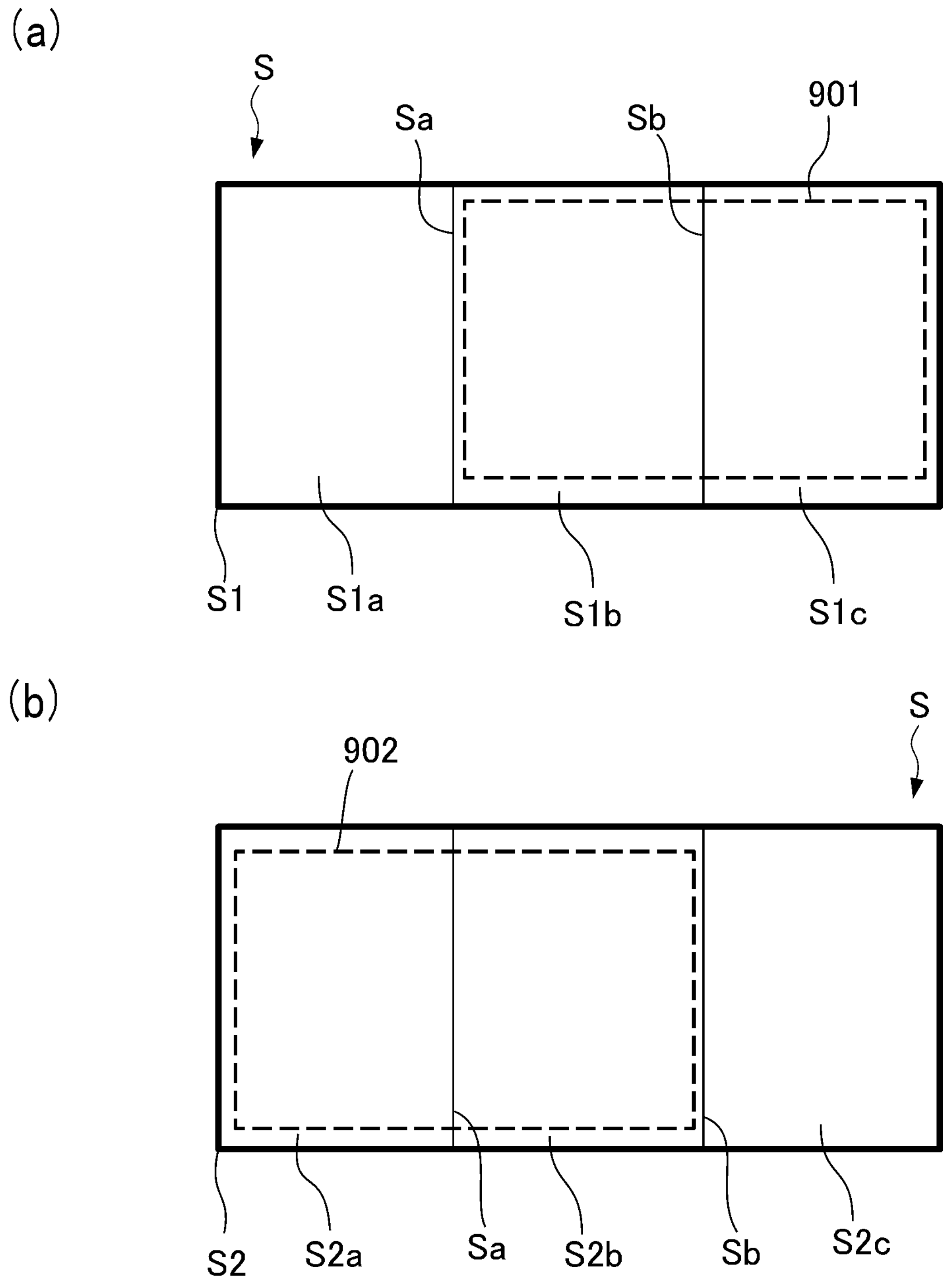

Parts (a) and (b) of FIG. 5 are schematic views of a three-fold pressure-bonding postcard sheet, in which part (a) shows a first surface side, and part (b) shows a second surface side.

Figure 6:
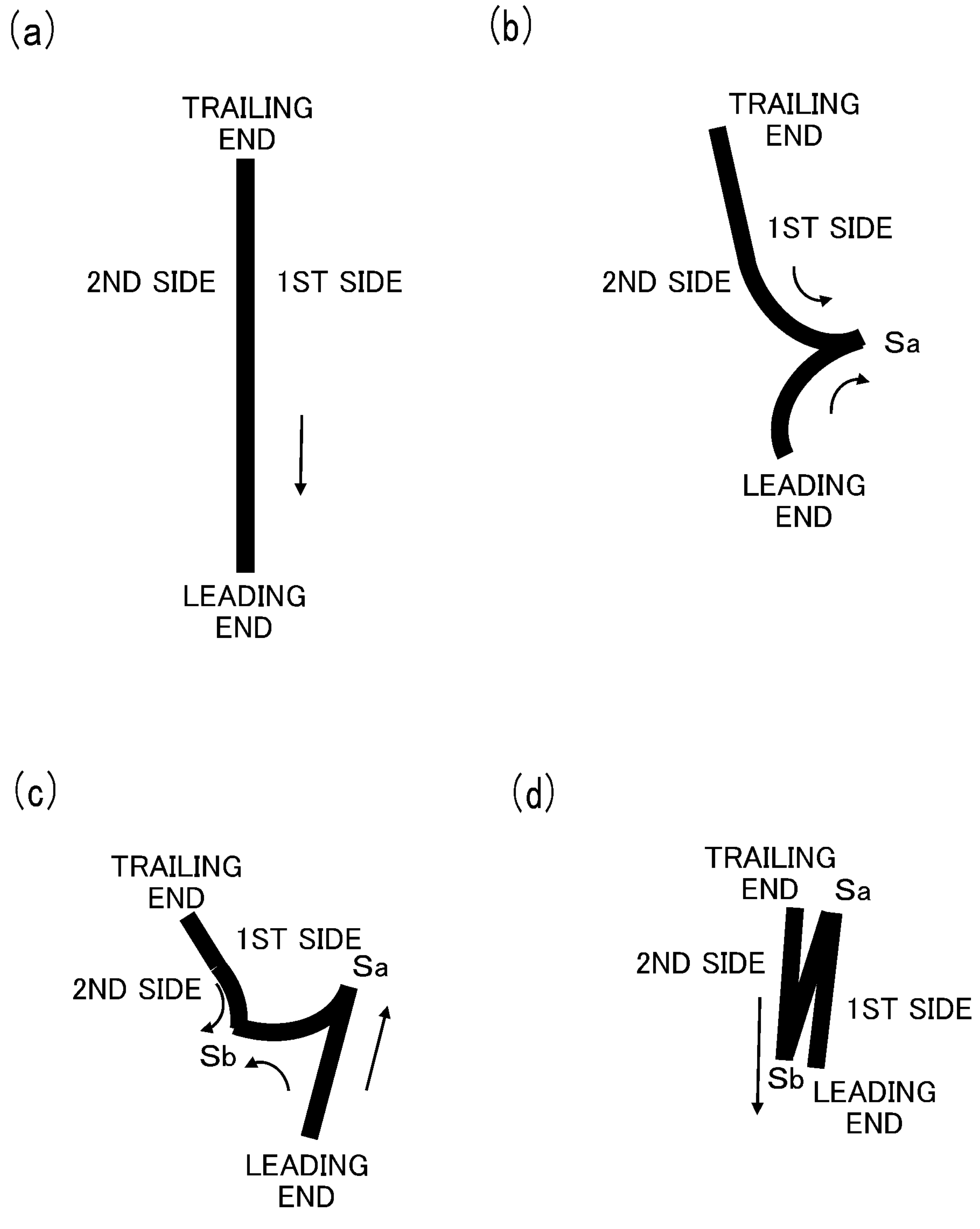

Parts (a) to (d) of FIG. 6 are schematic views showing states of a pressure-bonding postcard sheet in a three-fold operation, in which part (a) shows the state before a start of folding, part (b) shows the state of a first folding operation, part (c) shows the state of a second folding operation, and part (d) shows the state after an end of the folding.

FIG. 7 is a schematic view showing combinations of a set directions, feeding directions, and folding directions of pressure-bonding postcard sheets capable of appropriately preparing pressure-bonding postcards by three-folding.

Figure 8:
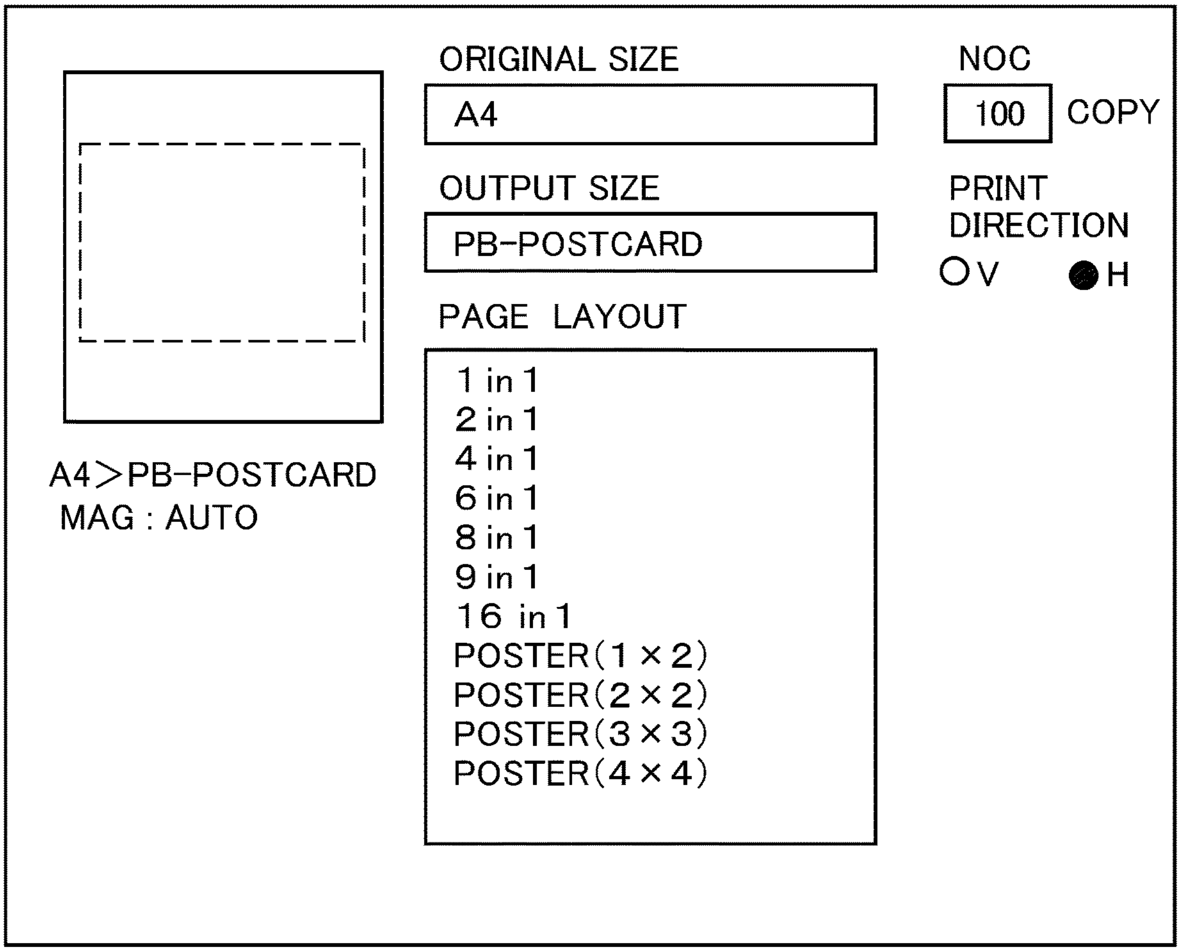

FIG. 8 is a schematic view showing a print setting screen capable of setting a layout change.

Figure 9:
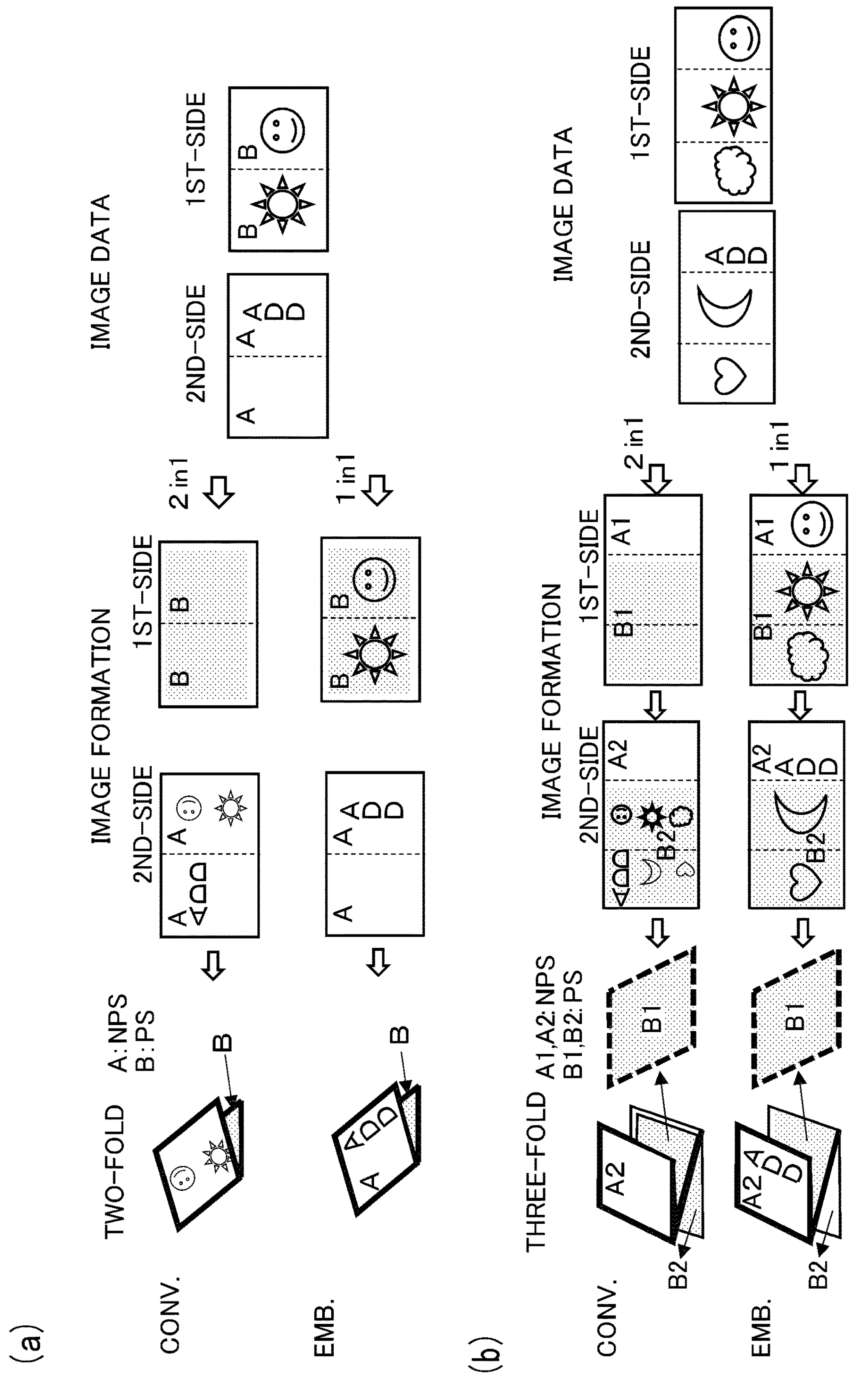

Parts (a) and (b) of FIG. 9 are schematic views each showing a toner image forming mode in each of the case where a layout change "2 in 1" is applied during pressure-bonding postcard preparation and the case where the layout charge "2 in 1" is not applied, in which part (a) shows the case of two-fold, and part (b) shows the case of three-fold.

Figure 10:
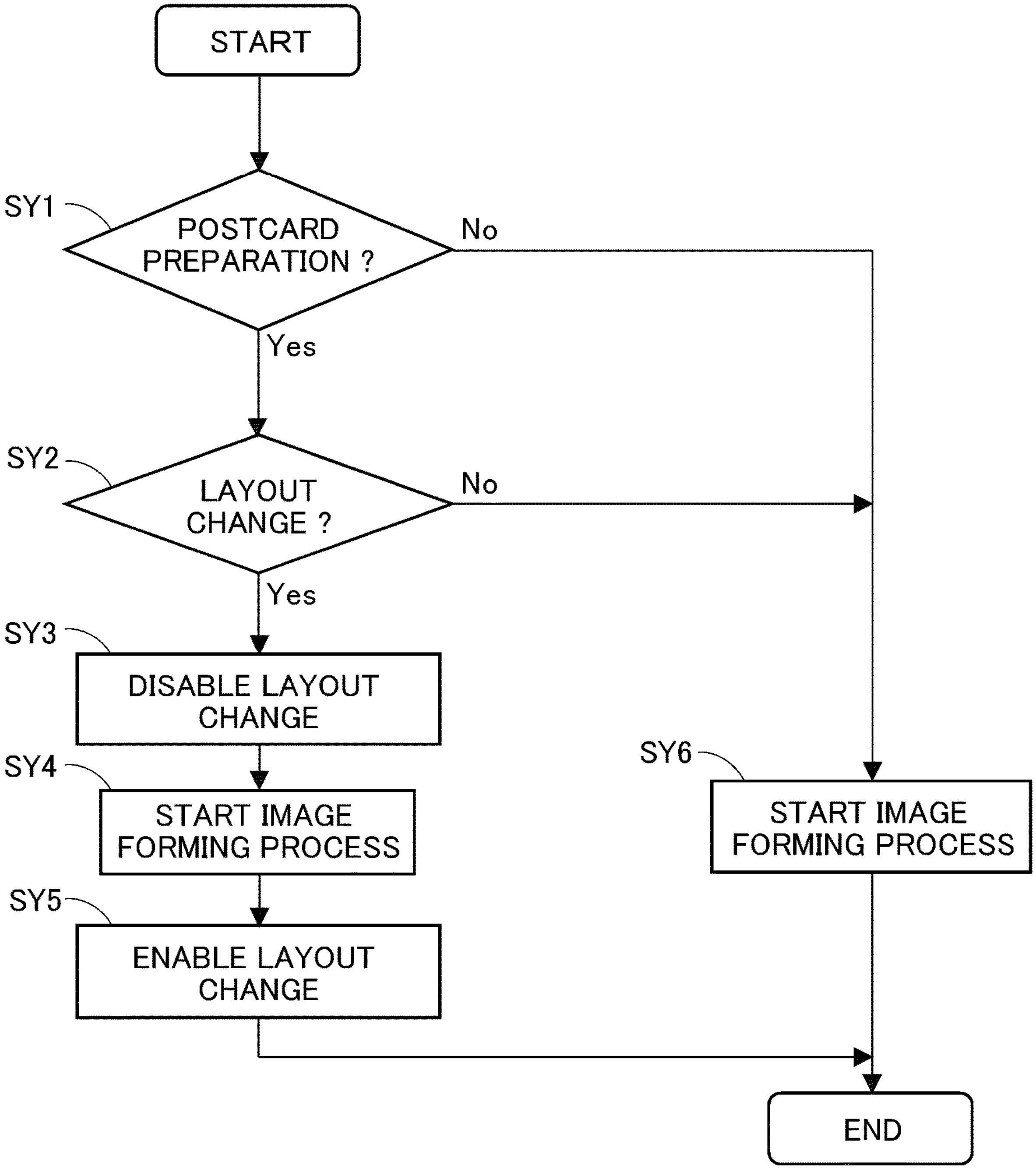

FIG. 10 is a flowchart showing a setting control processing in a first embodiment.

Figure 11:
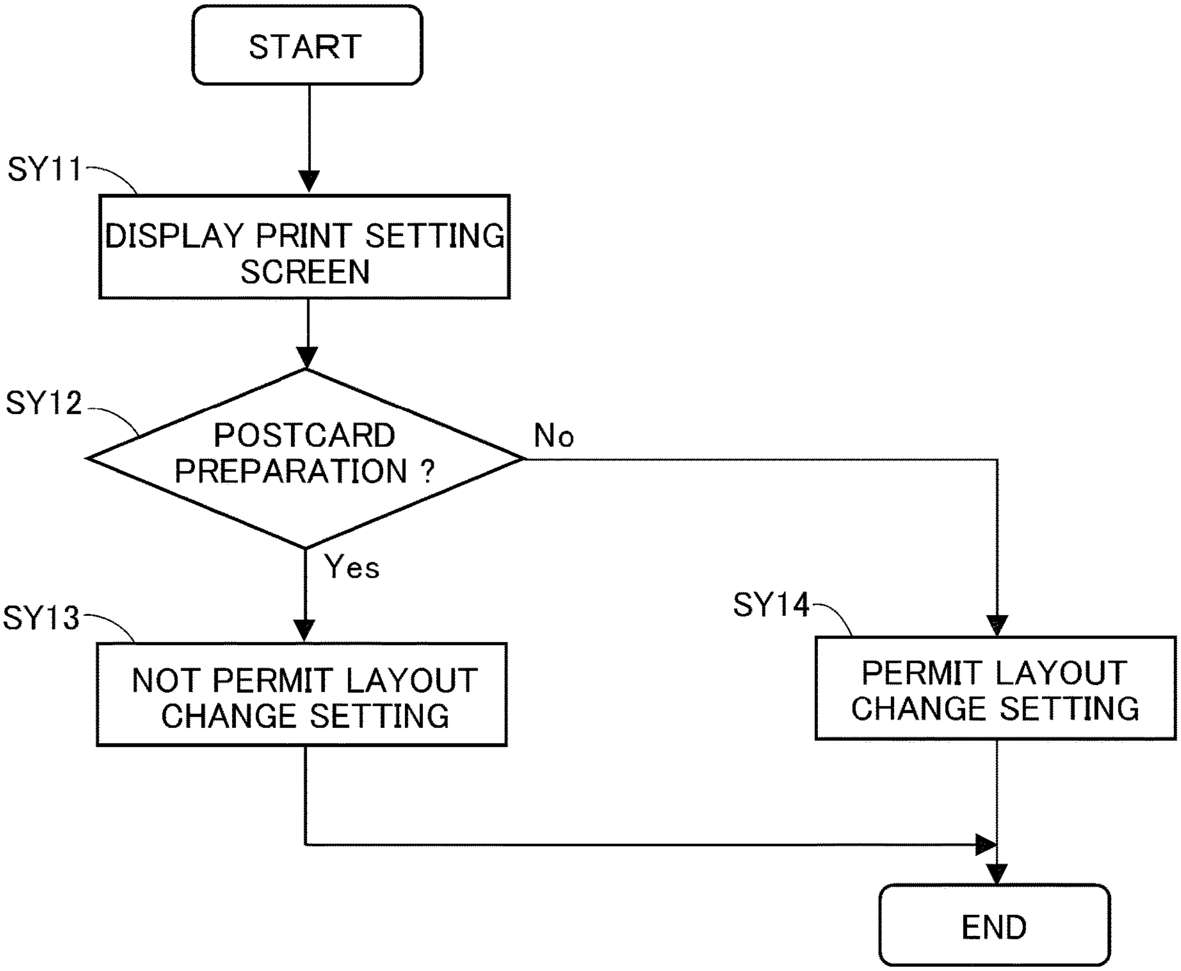

FIG. 11 is a flowchart showing a setting control processing in a second embodiment.

Figure 12:
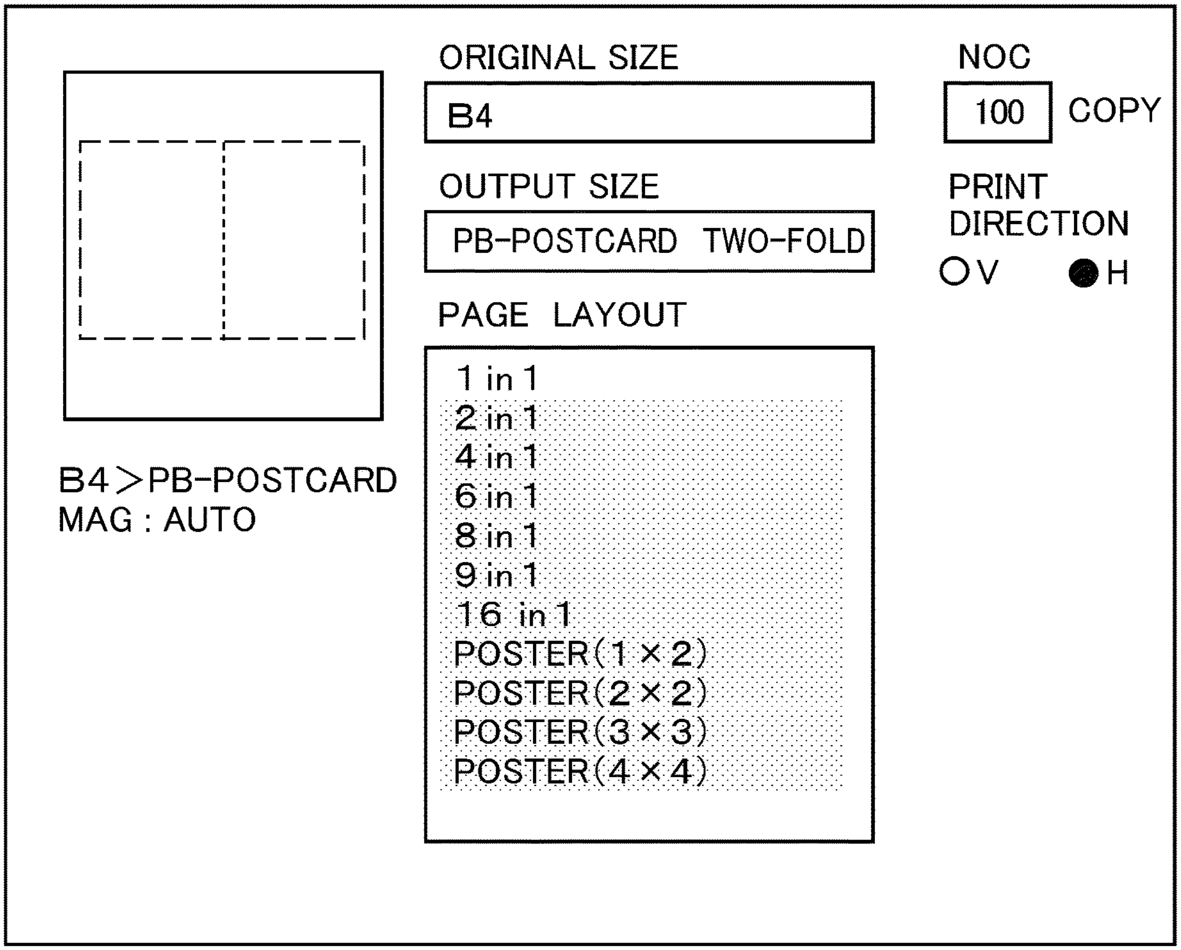

FIG. 12 is a schematic view showing a display example of a print setting screen in the case where setting of the layout change is not permitted.

Figure 13:
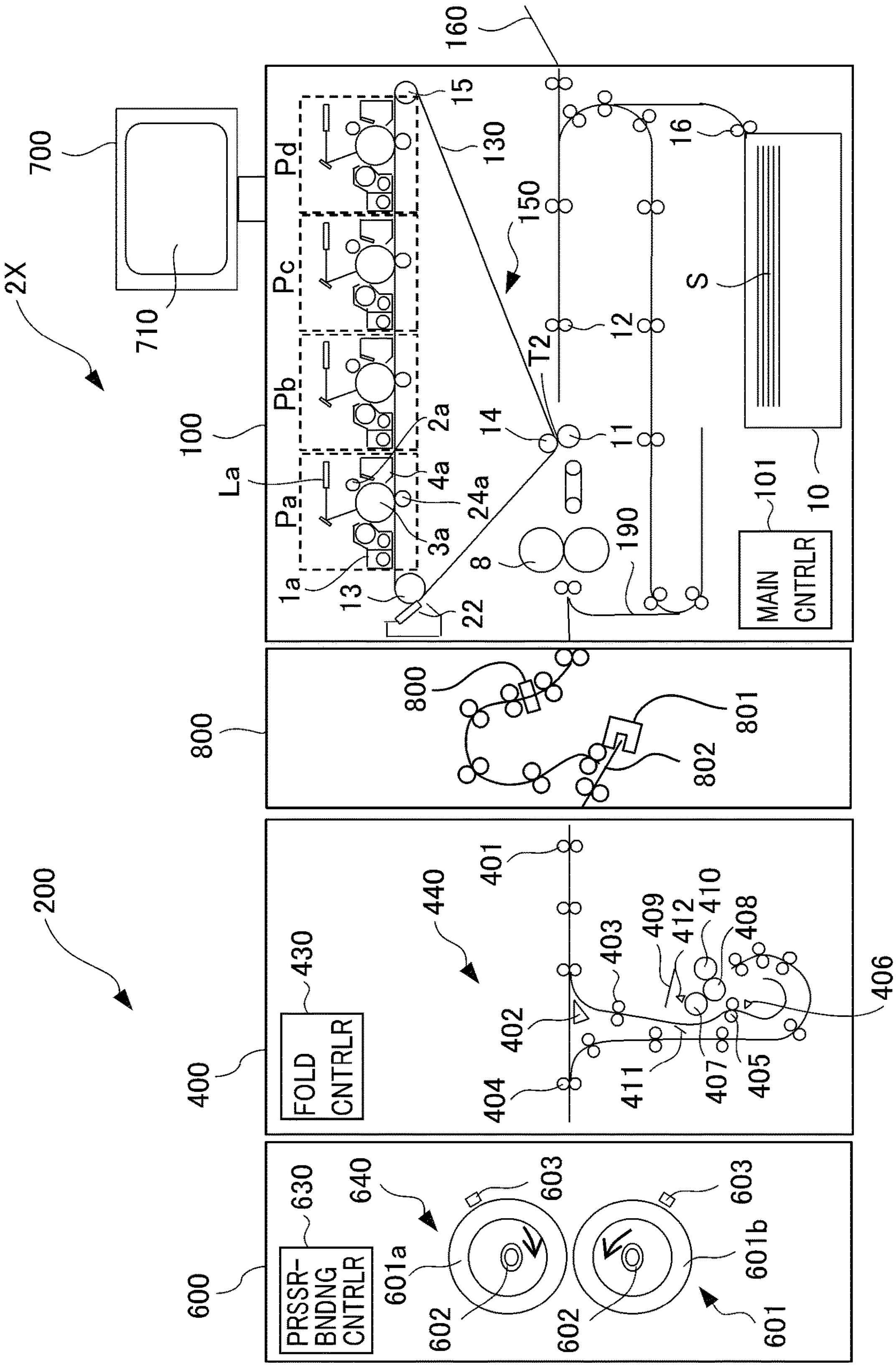

FIG. 13 is a schematic view showing an image forming system provided with a staple apparatus.

Figure 14:
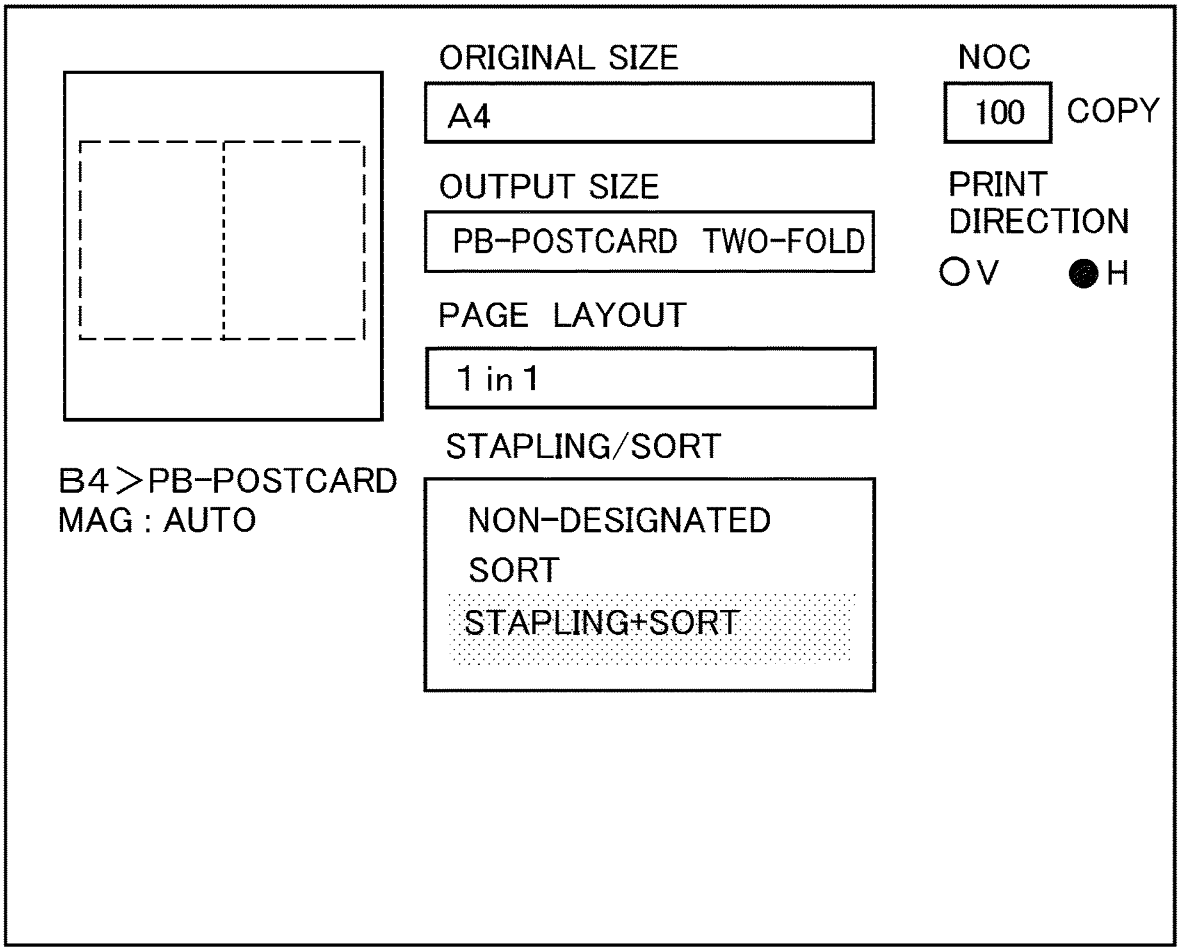

FIG. 14 is a schematic view showing a print setting screen capable of setting stapling.

DESCRIPTION OF THE EMBODIMENTS

First Embodiment

<Image Forming System>

In the following, a first embodiment will be described. First, an image forming system 1X of this first embodiment will be described. The image forming system 1X of this embodiment includes an image forming apparatus 100 for forming a toner image on a recording material S and a pressure-bonding processing apparatus 200 for subjecting the recording material S, on which the toner image is formed by the image forming apparatus 100, to pressure-bonding processing. The pressure-bonding processing apparatus 200 is a post-step unit retrofittable to the image forming apparatus 100 for expanding function, and the image forming apparatus 100 and the pressure-bonding processing apparatus 200 are connected to each other so as to be capable of delivering the recording material S therebetween. This image forming system 1X is capable of preparing a pressure-bonding print such as a pressure-bonding postcard by feeding the recording material S, on which the image is formed by the image forming apparatus 100, to the pressure-bonding processing apparatus 200 and then by folding and pressure-bonding the recording material S by the pressure-bonding processing apparatus 200.

Figure 1:
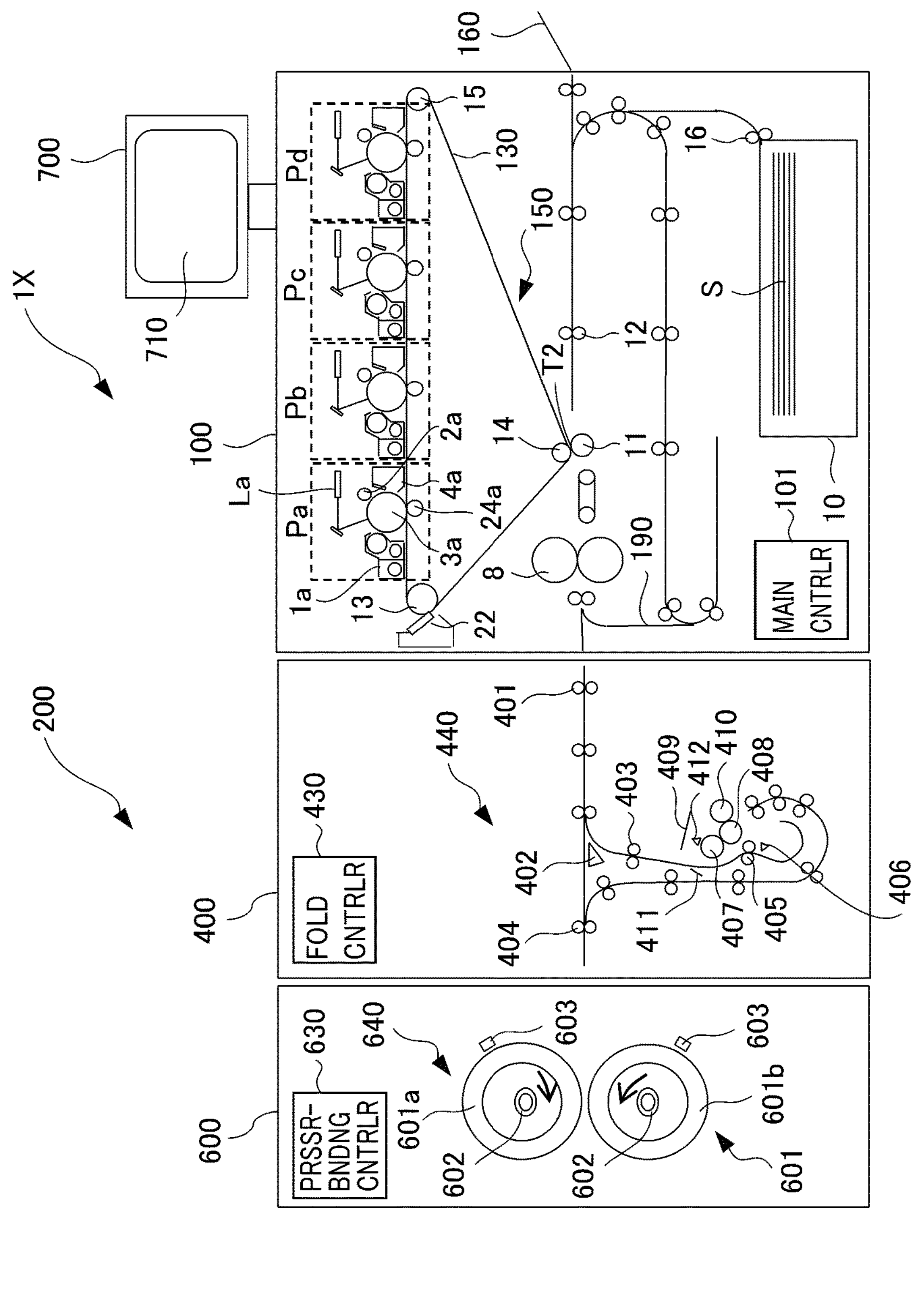
FIG. 1 is a schematic view showing an image forming system.

In FIG. 1, as the pressure-bonding processing apparatus 200, an apparatus including a folding processing apparatus 400, and a pressure-bonding apparatus 600 was shown as an example. The image forming apparatus 100, the folding processing apparatus 400, and the pressure-bonding apparatus 600 are connected to each other by input/output interfaces (not shown) capable of serial communication or parallel communication.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. As shown in FIG. 1, the image forming apparatus 100 forms a toner image on the recording material S on the basis of image data sent from an original reading device (not shown) connected to an apparatus main assembly or from an external device (not shown) such as a personal computer or an external controller connected to the apparatus main assembly so as to be capable of inputting and outputting data.

In the case of this embodiment, the image data includes information on a first toner image formed on one surface (side) of the recording material S, information on a second toner image formed on the other surface (side) of the recording material S, information on a manner of folding (for example, a folding position depending on a size of the recording material S) or on pressure-bonding surfaces (surfaces on a valley folding side), and the like information.

As shown in FIG. 1, the image forming portions Pa, Pb, Pc, and Pd are juxtaposed along a movement direction of the intermediary transfer belt 130 in the apparatus main assembly. The intermediary transfer belt 130 is stretched by a plurality of rollers (13, 14, 15) and is rotated. Then, the intermediary transfer belt 130 carries and feeds a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording material S is formed. On a side downstream of the secondary transfer portion T2 with respect to a recording material feeding direction, a fixing device 8 is provided.

The image forming apparatus 100 includes a cassette 10 in which recording materials S are accommodated. The recording material S is fed from the cassette 10 toward a registration roller pair 12 by a feeding roller 16. Thereafter, the registration roller pair 12 is started to be rotated in synchronism with the toner image formed on the intermediary transfer belt 130, so that the recording material S is fed toward the secondary transfer portion T2. A plurality of cassettes 10 capable of accommodating the recording materials S different in size and thickness are provided, and the recording material S selected by a user is fed from either one of the plurality of cassette 10. Incidentally, the recording material S is not limited to the recording material S accommodated in the cassette 10, but the recording material S stacked on a manual feeding tray 160 may also be fed. Further, a constitution in which an unshown recording material supplying apparatus as an option is connected to the image forming apparatus 100 and in which the recording material accommodated in the recording material supplying apparatus is supplied to the image forming apparatus 100 may be employed.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from illustration and description.

In the image forming portion Pa for yellow, a cylindrical photosensitive drum 3*a* is provided as a photosensitive member. The photosensitive drum 3*a* is rotationally driven in a predetermined direction at a predetermined process speed. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax).

As the binder resin, a known binder resin can be used. For example, it is possible to use resin materials such as a vinyl copolymer represented by a styrene-(meth)acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystalline wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer bias (voltage) is applied. After the transfer on the intermediary transfer belt 130, toner remaining on the surface of the photosensitive drum 3*a* is removed by the drum cleaning device 4*a*.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording material S accommodated in the cassette 10 is fed to the secondary transfer portion T2. Then, by applying a secondary transfer bias (voltage) to the outer secondary transfer roller 11, the toner images for a full-color image are collectively secondary-transferred onto the recording material S. Toner remaining on the intermediary transfer belt 130 after the transfer on the recording material S is removed by a belt cleaning device 22. Incidentally, in the case of this embodiment, an image forming unit 150 as an image forming means capable of forming the toner images on the recording material S is constituted by the image forming portions Pa to Pd, the intermediary transfer belt 130, the rollers (13, 14, 15), the outer secondary transfer roller 11, and the like.

The recording material S on which the toner images are formed is fed toward the fixing device 8 as a fixing means. The fixing device 8 includes a fixing roller and a pressing roller, and at a fixing nip formed by the fixing roller and the pressing roller, the fixing device 8 nips and feeds the recording material S on which the toner image is formed and thus heats and pressing the recording material S, so that the toner image is fixed on the recording material S.

The image forming apparatus 100 of this embodiment is capable of performing double-side printing. During an operation in a single-side image forming mode, the recording material S on which the toner image is fixed on one surface side by the fixing device 8 is conveyed to the pressure-bonding processing apparatus 200. During an operation in a double-side image forming mode, the recording material S on which the toner image is fixed on the one surface side by the fixing device 8 is conveyed toward a double-side reverse feeding portion 190. In the double-side feeding portion 190, the recording material S is reversed while being conveyed, so that a front surface (double-side) and a back surface (second surface) of the recording material S are replaced with each other. Then, the recording material S is fed toward the registration roller pair 12 through the double-side feeding portion 190. Then, the recording material S is fed by the registration roller pair 12 toward the secondary transfer portion T2 in a state in which the back surface side (second surface side) thereof where printing has not been carried out faces the intermediary transfer belt 130 side. At the secondary transfer portion T2, the toner images for a full-color image formed on the intermediary transfer belt 130 are collectively secondary-transferred on the back surface side of the recording material S. Thereafter, the recording material S is subjected to toner image fixing by the fixing device 8 and the recording material S on which the toner image is fixed is conveyed to the pressure-bonding processing apparatus 200.

Further, the image forming apparatus 100 includes a main controller 101. In the case of this embodiment, the main controller 10 as a control means controls the image forming apparatus 100 and the pressure-bonding processing apparatus 200 and is capable of executing an operation in a pressure-bonding print preparation mode in which a pressure-bonding print is prepared by pressure-bonding the recording material S, on which the toner image is fixed, by the pressure-bonding processing apparatus 200. That is, during the operation in the pressure-bonding print preparation mode, the main controller 101 executes an image forming step for forming the image on the recording material S by controlling the image forming apparatus 100 and executes a pressure-bonding processing step for folding and pressure-bonding the recording material S by controlling the pressure-bonding processing apparatus 200. A control constitution of the image forming system X will be described later (see FIG. 2).

<Recording Material>

Next, the recording material S will be described. In this embodiment, a recording material S of a pre-paste type including a base material and a pressure-sensitive adhesive layer is used. As the base material, a base material capable of forming the pressure-sensitive adhesive layer on at least one surface may only be required, and for example, it is possible to cite high-quality paper, medium-quality paper, coated paper, and the like. Further, from a viewpoint of confidentiality, it is desirable that the base material does not transmit light and that the toner image formed on one surface is prevented from being transparent and visible on the other surface. The pressure-sensitive adhesive layer is formed with a pressure-sensitive adhesive pseudo-bonded by pressure application and includes an adhesive base material and an adhesive force adjusting agent. As the adhesive base material, for example, composition containing a natural rubber latex, a modified product thereof, a synthetic rubber latex, a synthetic resin, and the like is used. The adhesive force adjusting agent is a filler in a fine particle shape, such as a known wax of paraffin wax or the like, or silica, titanium oxide, calcium carbonate, or the like. Each of these materials is low in affinity with the adhesive base material and adjusts the adhesive force as the pressure-sensitive adhesive.

The filler in the fine particle shape contained in the adhesive base material projects from the adhesive base material, whereby an uneven shape is formed on the pressure-sensitive adhesive layer surface. By this uneven shape, the adhesive base material does not appear at the surface during non-pressure application, and therefore an adhesive property is not expressed. On the other hand, when opposite surfaces on which the pressure-sensitive adhesive layer is applied are superposed and pressure-bonded to each other, the adhesive base material appears at the surface, and therefore, the adhesive property is expressed by the adhesive base material on each of the superposed surfaces. Here, when a transporting cost such a postage which is more inexpensive in a pressure-bonding postcard than in a sealed letter is taken into consideration, a basis weight of the recording material S may desirably be "64 g/$m^2$ to 209 g/$m^2$".

As the recording material S of such a pre-paste type, for example, it is possible to cite pressure-bonding postcard sheets ("POSTEX (THREE-FOLD)" (basis weight: 100 g/$m^2$, "POSTEX (TWO-FOLD)" (basis weight: 150 g/$m^2$)) manufactured by Toppan Forms Co., Ltd. Incidentally, in the following, the case where the "pressure-bonding postcard" is prepared as the pressure-bonding print will be described as an example.

<Pressure-Bonding Processing Apparatus>

Next, the pressure-bonding processing apparatus 200 will be described. As shown in FIG. 1, the pressure-bonding processing apparatus 200 in this embodiment includes the folding processing apparatus 400 as a folding unit, and the pressure-bonding apparatus 600. The folding processing apparatus 400 folds the recording material S so that an upper surface of the recording material S is an inside surface. The pressure-bonding apparatus 600 applies pressure to the folded recording material S.

In the following, the folding processing apparatus 400, and the pressure-bonding apparatus 600 will be described.

<Folding Processing Apparatus>

The folding processing apparatus 400 is an apparatus for subjecting, to folding (processing) for folding the recording material S subjected to the image forming step by the image forming apparatus 100. In this embodiment, as an example, the folding processing apparatus 400 of a roller press-contact type capable of folding the recording material S in three and two (three-fold processing and two-fold processing) was described. The folding processing apparatus 400 includes a folding processing controller 430 and a folding portion 440 for folding the recording material S. The folding processing controller 430 principally carries out control of the folding portion 440.

As regards an operation of the folding portion 440, as folding processing for folding the recording material S in Z-character form, three-fold (for example, external three-fold) will be described as an example. The recording material S fed from the image forming apparatus 100 is drawn into the folding processing apparatus 400 by an entrance roller pair 401 and is sorted to separate feeding passages by a branch flapper 402 depending on whether or not the folding processing is required to be performed. In the case where the folding processing is performed, the recording material S is sorted in a folding processing passage toward a feeding roller pair 403, and in the case where the folding processing is not performed, the recording material S is sorted into a folding-avoiding passage toward a discharging roller pair 404.

In the case where the recording material S is sorted into the folding processing passage, the recording material S is subjected to registration correction such that the recording material S is once stopped at a position of a registration roller pair 405 and a loop is formed. The recording material S subjected to the registration correction is fed again, and at a predetermined timing after the recording material S passes through a folding position detecting sensor 406, the recording material S is subjected to first folding processing simultaneously with drawing of the recording material S by a first folding roller 407 and a second folding roller 408. Then, when the drawn recording material P abuts against an abutment stopper 409, the recording material S is subjected to second folding processing simultaneously with drawing of the recording material S by the second folding roller 408 and a third folding roller 410. Thus, the recording material S is folded in a first fold on a first surface side so that one surface portions oppose each other and is folded in a second fold on a second surface side so that the other surface portions oppose each other. Then, the recording material S subjected to the second folding processing is conveyed toward the discharging roller pair 404 and is delivered to a subsequent pressure-bonding apparatus 600 by the discharging roller pair 404. Incidentally, in the case where the recording material S is sorted into the folding avoiding passage, the recording material S is not subjected to the above-described three-fold processing, and is delivered to the subsequent pressure-bonding apparatus 600 by the discharging roller pair 404.

As regards an operation of the folding processing portion 440, two-fold processing will be described as an example. In the case where the recording material S is sorted into the folding processing passage, the recording material S is subjected to the registration correction and then is fed again similarly as in the case of the above-described three-fold processing. Then, in the case of the two-fold processing, the recording material S is drawn by the first folding roller 407 and the second folding roller 408 and passes through the folding position detecting sensor 406, and thereafter, when a trailing end of the recording material S abuts against a trailing end abutment stopper 411, the recording material S is subjected to the folding processing. The recording material S is folded in two in a fold so that the one surface portions oppose each other. At this time, the drawn recording material S is guided by a leading end guide 412 moved to a predetermined position in advance, and thus is drawn by the second folding roller 408 and the third folding roller 410. The recording material S drawn by the second folding roller 408 and the third folding roller 410 is conveyed toward the discharging roller pair 404 and is delivered to the subsequent pressure-bonding apparatus 600 by the discharging roller pair 404. Incidentally, in the case where the recording material S is sorted into the folding avoiding passage, the recording material S is not subjected to the above-described bi-fold processing, and is delivered to the subsequent pressure-bonding apparatus 600 by the discharging roller pair 404. Further, in this embodiment, in the case where the recording material S on which the toner images are formed on double (both) surfaces (sides) is conveyed, the recording material S is subjected to the two-fold processing by being folded in a valley so that second surface side portions, i.e., surfaces (sides) where the toner image is formed later oppose each other.

<Pressure-Bonding Apparatus>

Next, the pressure-bonding apparatus 600 will be described. The pressure-bonding apparatus 600 is an apparatus for subjecting, to pressure-bonding for pressure-bonding the recording material S, the recording material S subjected to a folding processing step by the above-described folding processing apparatus 400. In this embodiment, as an example, the pressure-bonding apparatus 600 of a roller press-contact type capable of pressure-bonding processing of the recording material S by applying heat and pressure to the recording material S through the pressure-bonding roller pair nipping and conveying the recording material S was described. The pressure-bonding apparatus 600 includes a pressure-bonding region controller 630, and a pressure-bonding portion 640 for pressure-bonding the recording material S. The pressure-bonding processing controller 630 principally carries out control of the pressure-bonding portion 640.

The pressure-bonding portion 640 will be described. The pressure-bonding portion 640 includes a pressure-bonding roller pair 601 for nipping and feeding the recording material S by rotation, heaters 602 for heating the pressure-bonding roller pair 601, and thermistors 603 for detecting a temperature of the pressure-bonding pair 601. The pressure-bonding roller pair 601 includes an upper roller 601*a* and a lower roller 601*b* which are maintained at desired temperatures by the heaters 602 depending on detection temperatures of the thermistors 603, respectively. Further, the pressure-bonding roller pair 601 is capable of applying heat and pressure to the recording material S while nipping and feeding the recording material S in a folded state. By this, the recording material S folded so that the pressure-sensitive adhesive layer is positioned inside is subjected to pseudo-bonding so as to bond the pressure-sensitive adhesive layer together.

Here, from the viewpoints of adhesive strength and a re-peeling property, there is a need to apply control the temperature and the pressure during the pressure-bonding processing. This is because there is a liability that in the case where the pressure and the temperature during the pressure-bonding processing are low, the adhesive force is weakened and thus a pseudo-bonding state cannot be maintained. On the other hand, in the case where the pressure and the temperature during the pressure-bonding processing are high, the adhesive force becomes strong, so that there is a liability that the re-peeling property decreases such that the paper is broken during the re-peeling. Therefore, there is a need to apply set the pressure and the temperature during the pressure-bonding processing depending on a kind of the recording material S. For example, the temperature of the pressure-bonding roller pair 601 of the pressure-bonding apparatus 600 is set at "15° C. to 80° C.", preferably "20° C. to 60° C.", and the pressure thereof is set at "2MPa" or more, so that an appropriate adhesive force can be obtained.

Incidentally, a pressure applied to the recording material S in the fixing device 8 is about "0.1-0.5 MPa". The recording material S exhibits an adhesive property by exposure of the adhesive base material to the surface under application of a high pressure (several MPa or more). For that reason, in the fixing device 8 low in pressure, the recording material S is in a high-temperature state of "100° C. to 200° C.", but the adhesive base material is not readily exposed to the surface, and therefore, the adhesive property does not exhibit, so that the adhesive base material is not deposited.

<Control Constitution of Image Forming System>

Next, control of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the folding processing apparatus 400 and the pressure-bonding apparatus 600) and controls the apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
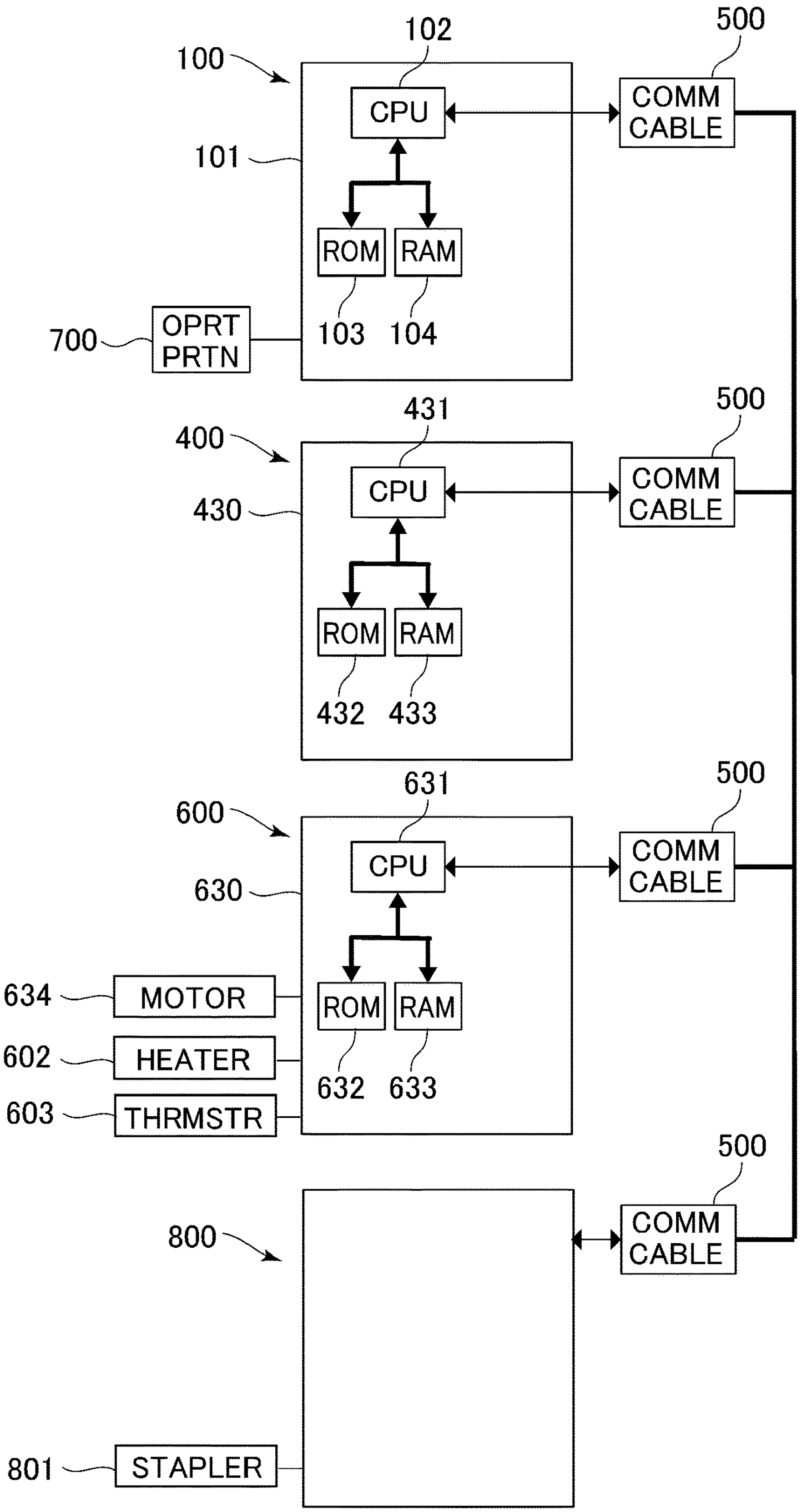
FIG. 2 is a control block diagram showing a control constitution of the image forming system.

In the image forming system 1X of this embodiment, as shown in FIG. 2, to the main controller 101, the processing controller 430 and the pressure-bonding processing controller 630 are connected via communication cables 500 so as to be capable of communicating operation instructions and various data. In accordance with the operation instructions from the main controller 101, the folding processing controller 430 causes the folding processing apparatus 400 to operate, and the pressure-bonding processing controller 630 causes the pressure-bonding apparatus 600 to operate. That is, while the main controller 101 controls the operation of the image forming apparatus 100, the main controller 101 is capable of controlling the entirety of the image forming system 1X by sending the operation instructions to the pressure-bonding processing apparatus 200 (the folding processing apparatus 400 and the pressure-bonding apparatus 600).

The main controller 101, the folding processing controller 430, and the pressure-bonding processing controller 630 which are described above may have the same constitution. For example, each of the controllers includes a CPU (central processing unit), a ROM (read only memory), and a RAM (random access memory). Further, each of the controllers includes an ASIC (application specific integrated circuit).

The main controller 101 includes the CPU 102, the ROM 103, and the RAM 104. In the ROM 103 and the RAM 104, various programs and various data for a setting control processing (see FIGS. 10 and 11) described later. Incidentally, the RAM 104 is capable of temporarily storing a calculation (computation) processing result or the like with execution of the various programs.

The image forming apparatus 100 includes an operating portion 700 including, for example, a liquid crystal display portion 710 (see, FIG. 1), and the operating portion 700 as a selecting means is connected to the main controller 101. The operating portion 700 is, for example, a touch panel, and on a liquid crystal display portion 710, various screws presenting the various programs and various data or the like can be displayed. Further, the operating portion 700 receives input of a start of the various programs and input of the various data depending on a user operation such as a touch operation by the user.

The user is capable of inputting a start of an "image forming job" from the operating portion 700 or an external device (not shown) and is capable of making setting for preparing the pressure-bonding postcard through the operating portion 700. In the case where the image forming job" is inputted, the CPU 102 executes the setting control processing (program) stored in the ROM 103. With this execution, together with the image forming apparatus 100, the pressure-bonding processing apparatus 200 (the folding processing apparatus 400 and the pressure-bonding apparatus 600) is capable of being operated.

The folding processing controller 430 includes a CPU 431, a ROM 432, and a RAM 433. The CPU 431 causes the folding processing apparatus 400 to operate on the basis of a control program stored in the ROM 432.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601, the heaters 602 for heating the pressure-bonding roller pair 601, and the thermistors 603 for detecting the temperatures of the pressure-bonding roller pair 601 are connected. The pressure-bonding processing controller 630 sends a detection result (temperature data) of the thermistors 603 to the main controller 101. Further, the pressure-bonding processing controller 630 is capable of changing the temperatures of the heaters 602 by receiving a target temperature from the main controller 101. Further, the pressure-bonding processing controller 630 is capable of changing the number of rotations of the motor 634 by receiving a target speed of the recording material from the main controller 101.

Next, a setting (set) direction, a feeding direction, and a folding direction of the pressure-bonding postcard sheet capable of appropriately preparing the pressure-bonding postcard by the two-folding will be described using part (a) of FIG. 3 to FIG. 4 while making reference to FIG. 1.

In the image forming apparatus 100, as the recording material S, the pressure-bonding postcard sheet is supplied from the cassette 10, the manual feeding tray 160, or a set portion of a recording material supplying position (not shown) connected to the image forming apparatus 100. At this time, depending on the set portion, the setting direction and the like of the pressure-bonding postcard sheet, a feeding manner of the pressure-bonding postcard sheet, of which either one of a first surface side and a second surface side is directed upward, from the image forming apparatus 100 to the folding processing apparatus 400 changes. As regards the two-fold pressure-bonding postcard sheet, a paste surface having the above-described pressure-sensitive adhesive layer exists on a first (one) surface side, and a non-paste surface having no pressure-sensitive adhesive layer exists on a second (the other) surface side, and therefore, there is a need that the two-fold pressure-bonding postcard sheet is fed from the image forming apparatus 100 to the folding processing apparatus 400 so that the first surface side is folded and pressure-bonded.

Part (a) of FIG. 3 shows the first surface side of the two-fold pressure-bonding postcard sheet, part (b) of FIG. 3 shows the second surface side of the two-fold pressure-bonding postcard sheet, and part (c) of FIG. 13 shows a folded state of the two-fold pressure-bonding postcard sheet. As an example, the pressure-bonding postcard sheet is set on the manual feeding tray 160 so that a paste surface 900 (first surface side S1) having the pressure-sensitive adhesive layer is directed upward (paste surface: up). Then, on the paste surface 900, a toner image which is desired to be concealed by the user is formed so that the toner image cannot be read from an outside, and on the non-paste surface (second surface side, S2) having no pressure-sensitive adhesive layer, a toner image, such as an address, which is desired to be readable from the outside is formed.

Thereafter, the pressure-bonding postcard sheet on which the toner images are fixed is fed from the image forming apparatus 100 to the folding processing apparatus 400 in a feeding direction in which the paste surface 900 is directed upward ("FACE UP"), and then is folded in two at a folding portion Sa by the folding processing apparatus 400. A folding direction in which the pressure-bonding postcard sheet is folded is different depending on the folding processing apparatus 400, so that when the pressure-bonding postcard sheet is fed from the image forming apparatus 100, the case where an upward side thereof is folded in a mountain and the case where the upward side thereof is folded in a valley exist. In the case of this embodiment, the pressure-bonding postcard sheet is folded in the valley at the folding portion Sa on the paste surface 900 side (first surface side S1) (feeding direction: valley folding). Then, the folded pressure-bonding postcard sheet is discharged from the folding processing apparatus 400 toward the pressure-bonding apparatus 600 in a feeding direction in which the non-paste surface (second surface side S2) is an upward surface and in which the folding portion Sa side (fold position) is a leading end with respect to the recording material feeding direction, and then is pressure-bonded by the pressure-bonding apparatus 600.

As described above, whether or not the pressure-bonding postcard can be appropriately prepared is determined depending on whether the pressure-bonding postcard sheet is set to a set portion with the paste surface 900 directed upward or downward, whether the pressure-bonding postcard sheet is fed in a state that which one of the paste surface 900 and the non-paste surface is directed upward, and whether the pressure-bonding postcard sheet is folded in the valley or in the mountain. In FIG. 4, combinations of the set directions, the feeding directions, and the folding directions of pressure-bonding postcard sheets capable of appropriately preparing pressure-bonding postcards through two-folding are shown. The above-described example corresponds to the combination indicated by "E1". As regards other combinations "E2 to E4", description thereof will be omitted.

Next, the set directions, the feeding directions, and the folding directions of pressure-bonding postcard sheets capable of apply preparing three-fold (specifically outward three-fold) pressure-bonding postcards will be described using part (a) of FIG. 5 to FIG. 7 while making reference to FIG. 1. In the image forming apparatus 100, the pressure-bonding postcard sheet is fed as the recording material S from a set portion such as the cassette 10, the manual feeding tray 160, or the recording material supplying apparatus (not shown) connected to the image forming apparatus 100. At this time, depending on the set portion, the set direction, and the like of the pressure-bonding postcard sheet, whether the supplied pressure-bonding postcard is fed from the image forming apparatus 100 to the folding processing apparatus 400 in a state that which one of the first surface side and the second surface side thereof is directed upward is changed. As regards the three-fold pressure-bonding postcard sheet, on each of the first surface side and the second surface side, the above-described paste surface having the pressure-sensitive adhesive layer and the above-described non-paste surface having no pressure-sensitive adhesive layer exist, so that there is a need that the pressure-bonding postcard sheet is fed from the image forming apparatus 100 to the folding processing apparatus 400 in a manner such that the paste surfaces are pressure-bonded to each other.

Part (a) of FIG. 5 shows the first surface side of the three-fold pressure-bonding postcard sheet, and part (b) of FIG. 6 shows the second surface side of the three-fold pressure-bonding postcard sheet. As an example, the pressure-bonding postcard sheet is set on the manual feeding tray 160 so that the first surface side S1 on which a paste surface 901 is formed is directed upward (paste surface: up) and so that the second surface side S2 on which a paste surface 902 is formed is directed downward. Then, toner images which are desired to be concealed by the user are formed on the paste surfaces 901 and 902, and toner images which are desired to be viewable from an outside are formed on non-paste surfaces S1*a* and S2*c* each having no-pressure-sensitive adhesive layer.

Thereafter, the pressure-bonding postcard sheet on which the toner images are fixed is fed from the image forming apparatus 100 to the folding processing apparatus 400 in a feeding direction in which the first surface side S1 (paste surface 901) is directed upward ("FACE UP"), and then is folded at folding portions Sa and Sb by the folding processing apparatus 400. The folding direction in which the pressure-bonding postcard sheet is folded is different depending on the folding processing apparatus 400 used, and then the pressure-bonding postcard sheet is fed from the image forming apparatus 100, the case where the upward side thereof is folded in the maintain and the case where the upward side thereof is folded in the valley exist.

In the case of this embodiment, as shown in parts (a) and (b) of FIG. 6, the pressure-bonding postcard sheet is folded in the mountain at the folding portion Sa by a first folding operation. Thereafter, as shown in part (c) of FIG. 6, the pressure-bonding postcard sheet is folded in the valley at the folding portion Sb by a second folding operation (feeding direction: Z-folding). Then, the folded pressure-bonding postcard sheet is, as shown in part (d) of FIG. 6, discharged from the folding processing apparatus 400 to the pressure-bonding apparatus 600 in a feeding direction in which the non-paste surface S1*a* of the first surface side S1 is the upward surface and in which the folding portion Sb side (fold position) is a leading end of the recording material feeding direction, and then is pressure-bonded by the pressure-bonding apparatus 600.

In FIG. 7, combinations of the set directions, the feeding directions, and the folding directions of the pressure-bonding postcard sheets capable of appropriately preparing the pressure-bonding postcards through three-folding are shown. The above-described example corresponds to the combination indicated by "F1". As regards other combinations "F2 to F4", description thereof will be omitted.

<Print Setting Screen>

In the case of this embodiment, the user is capable of setting whether or not the pressure-bonding postcard is prepared, through a "print setting screen" displayed on the operating portion 700 or the external device. In FIG. 8, an example of the "print setting screen" is shown. As shown in FIG. 8, on the "print setting screen", an original (document) size, an output size, the number of copies, a print direction, and a page layout are capable of being set by the user. On this "print setting screen", in the case where the "pressure-bonding postcard" is set as the output size, setting for preparing the pressure-bonding postcard is made. In an example shown in FIG. 8, the setting is made so that the "pressure-bonding postcard" on which a toner image made reduced more than when the toner image is formed on a pressure-bonding postcard with an original size of "A4" is prepared in "100" copies.

Further, the user is capable of setting a layout change such that images corresponding to a plurality of pages are placed (formed) on one page, by applying selecting the page layout of the "print setting screen". For example, the user is capable of selecting "2 in 1" in which toner images corresponding to 2 pages are formed on 1 (one) page, "4 in 1" in which toner images corresponding to 4 pages are formed on 1 page, "6 in 1" in which toner images corresponding to 6 pages are formed on 1 page, or the like from options shown in the page layout. Incidentally, initial setting of the layout is a "1 in 1" in which a toner image corresponding to 1 page is formed on the 1 page.

However, as had already been described above, conventionally, the above-described setting of the layout change was enabled also when the pressure-bonding postcard was prepared. In an upper stage of each of parts (a) and (b) of FIG. 9, a toner image forming mode in, as a conventional example, the case where the layout change of "2 in 1" is applied during preparation of the pressure-bonding postcard is shown. Part (a) of FIG. 9 shows the case where the pressure-bonding postcard is prepared by using the two-fold pressure-bonding postcard sheet, and part (b) of FIG. 9 shows the case where the pressure-bonding postcard is prepared by using the three-fold pressure-bonding postcard sheet.

In each of parts (a) and (b) of FIG. 9, in the order from a right side to a left side, image data of toner images formed on the first side and the second side of the pressure-bonding postcard sheet, the toner images formed on the first surface side of the pressure-bonding postcard sheet, the toner images formed on the second surface side of the pressure-bonding postcard sheet, and a state of the pressure-bonding postcard sheet after folding processing and before pressure-bonding are shown.

The image data used in the two-folding includes data on the toner images so as to form the toner images of a smile mark and a sun mark on the first surface and so as to form the toner image of "ADDRESS" on a right side of the second surface. The image data used in the three-folding include data on the toner images so as to form the toner images of the smile mark, the sun mark, and a cloud mark on the first surface and so as to form the toner images of the "ADDRESS" on the non-paste surface of the second surface and a moon mark and a heat mark on the paste surface of the second surface.

In the case of the two-fold, as shown in part (a) of FIG. 9, conventionally, the smile mark and the sun mark which are to be originally formed on the first surface of a pressure-bonding surface B so as not to be readable from an outside were formed on the second surface, and the "ADDRESS" was formed on a left side which is different from an original side (right side) in a different direction. In the case of the three-fold, as shown in part (b) of FIG. 9, conventionally, the smile mark, the sun mark, and the cloud mark which are to be originally formed are all formed on the right side of the paste surface of the second surface. Further, conventionally, the "ADDRESS", and the moon mark and the heat mark which are to be originally divided and formed on the non-paste surface of the paste surface of the second surface are formed on the left side of the paste surface of the second surface. Thus, conventionally, when the layout change is made during preparation of the pressure-bonding postcard, the respective toner images are not formed at portions where the toner images should be originally formed, so that it was difficult to appropriately prepare the pressure-bonding postcard.

<Setting Control Processing>

Therefore, in this embodiment, even in the case where the layout change setting is made when the pressure-bonding postcard is prepared, the pressure-bonding postcard was enabled to apply preparation of the pressure-bonding postcard by forming the toner images in original positions shown in a lower stage of each of parts (a) and (b) of FIG. 9. In the following, setting control processing in the first embodiment for realizing the preparation of the pressure-bonding postcard will be described using FIG. 10 while making reference to FIG. 2. The setting control processing in this embodiment is started by the main controller 101 with the input of the start of the "image forming job" and is ended with an end of the "image forming job".

As shown in FIG. 10, the main controller 101 discriminates whether or not the setting is a setting of an operation in the pressure-bonding print preparation mode in which the pressure-bonding postcard is prepared by pressure-bonding the pressure-bonding postcard sheet (SY1). As described above, the setting as to whether or not the pressure-bonding postcard is prepared can be made from the "print setting screen" (see, FIG. 8) by the user. In the case where the setting is a setting in which the pressure-bonding postcard is not prepared (No of SY1), the main controller 101 causes the image forming apparatus 100 to start the image forming processing for forming the toner image on the recording material S other than the pressure-bonding postcard sheet on the basis of image data (SY6). In this case, after the toner image is formed on the recording material S, the recording material S on which the toner images are formed on double sides or on which the toner image is formed on one side is outputted without performing pressure-bonding processing by the pressure-bonding processing apparatus 200.

In the case where the setting is the setting in which the pressure-bonding postcard is prepared (Yes of SY1), the main controller 101 discriminates whether or not the layout change is set (SY2). As described above, the layout change can be made from the "print setting screen" (see, FIG. 8) by the user. In the case where the layout change is not set when the setting is setting in which the pressure-bonding postcard is prepared (No of SY2), the main controller 101 causes the image forming apparatus 100 to start the image forming processing for forming the toner image on the pressure-bonding postcard sheet (SY6). In this case, after the toner image is formed on the pressure-bonding postcard sheet, the pressure-bonding postcard sheet is subjected to the pressure-bonding processing by the pressure-bonding processing apparatus 200, so that the pressure-bonding postcard is prepared (operation in the pressure-bonding print preparation mode). In the case where the layout change is not set, the layout is "1 in 1" which is the initial setting, so that as shown in the lower stage of part (a) of FIG. 9 and in the lower stage of part (b) of FIG. 9, the pressure-bonding postcard on which the toner images were formed at portions where the toner image should be formed on the basis of image data is prepared.

On the other hand, in the case where the layout change is set when the setting is the setting in which the pressure-bonding postcard is prepared (Yes of SY2), the main controller 101 disables the set layout change, and thus changes the layout to the "1 in I" which is the initial setting (SY3). Thereafter, the main controller 101 causes the image forming apparatus 100 to start the image forming processing for forming the toner image on the pressure-bonding postcard sheet (SY4). Then, after the toner image is formed on the pressure-bonding postcard sheet, the pressure-bonding postcard sheet is subjected to the pressure-bonding processing by the pressure-bonding processing apparatus 200, so that the pressure-bonding postcard is prepared (operation in the pressure-bonding print preparation mode). That is, in the case where the layout change is set before execution of the operation in the pressure-bonding print preparation mode, the main controller 101 causes the image forming apparatus 100 to form the toner image without executing the layout change during the execution of the operation in the pressure-bonding print preparation mode.

Thus, in the case where the layout change is set when the setting is the setting in which the pressure-bonding postcard is prepared, the layout change is disabled, so that the layout is changed to the initial setting of "1 in 1". Accordingly, as shown in the lower stage of part (a) of FIG. 9 or in the lower stage of part (b) of FIG. 9. When the "image forming job" is ended, the main controller 101 enables the disabled layout change (SY5), and then ends the "setting control processing".

As described above, in this embodiment, in the case where the layout change is set when the setting is the setting in which the pressure-bonding postcard is prepared, the layout change is disabled during the preparation of the pressure-bonding postcard. By doing so, even in the case where the layout change is set when the setting is the setting in which the pressure-bonding postcard is prepared, the layout change is not applied, and the toner image corresponding to 1 page is formed on 1 page of the pressure-bonding postcard sheet, so that the pressure-bonding postcard is prepared. By this, different from the conventional constitution, the toner image intended to be formed on the pressure-bonding postcard so as not to be read from the outside is not formed on the pressure-bonding postcard so as to be read from the outside with the layout change, so that in this embodiment, the pressure-bonding postcard can be appropriately prepared. Incidentally, after the preparation of the pressure-bonding postcard, the layout change is enabled again, so that a user setting error such that the toner image is printed (formed) in the "1 in 1" mode on the recording material S other than the pressure-bonding postcard after the preparation of the pressure-bonding postcard is made hard to occur.

Second Embodiment

In the above-described first embodiment, the layout change set by the user device the preparation of the pressure-bonding postcard is disabled, but the present invention is not limited thereto. For example, in the case where the operation in the pressure-bonding print preparation mode is executed, in this embodiment, when the preparation of the pressure-bonding postcard is selected by the user through the "print setting screen" (see, FIG. 8), the setting of the layout change may be made unallowable. In the following, setting control processing in the second embodiment for realizing it will be described using FIGS. 11 and 12 while making reference to FIG. 2.

As shown in FIG. 11, the main controller 101 causes, for example, the liquid crystal display portion 710 of the operating portion 700 to display the "print setting screen" (see, FIG. 8) (SY11). Then, the main controller 101 discriminates whether or not the setting is a setting of the operation in the pressure-bonding print preparation mode in which the pressure-bonding postcard is prepared by subjecting the pressure-bonding postcard sheet to the pressure-bonding processing (SY12). As described above, the setting as to whether or not the pressure-bonding postcard is prepared can be made by the user from the "print setting screen" (see, FIG. 8). In the case where in the "print setting screen", the user sets the recording material S other than the "pressure-bonding postcard" as an output size (No of SY12), the main controller 101 permits the layout change setting, so that the "print setting screen" is displayed so that the user can select the layout change (SY14). That is, in the "print setting screen" shown in FIG. 8, the user can select an arbitrary layout from options of the page layout. In this case, the recording material S is not subjected to the pressure-bonding processing by the pressure-bonding processing apparatus 200, so that the pressure-bonding postcard is not prepared, but the recording material S on which the toner image is formed in a layout desired by the user is outputted.

On the other hand, in the case where in the "print setting screen", the user sets the "pressure-bonding postcard" as the output size (Yes of SY12), the main controller 101 does not permit the layout charge setting, and the "print setting screen" is displayed so that the user is not permitted to select the layout change (SY13). In FIG. 12, a display example of the print setting screen in the case where the layout change setting is not permitted is shown. As shown in FIG. 12, in the page layout, for example, the layout options other than the "1 in 1" layout is grayed out, so that the user is prevented from arbitrarily selecting a layout other than the "1 in 1" layout from the page layout options. Incidentally, as a means other than the gray-out, another means such that layout display other than the "1 in 1" layout is caused to disappear or such that user selection is not received although the layout display is the same as normal layout display.

Thus, in the second embodiment, at the time when the user sets the preparation of the pressure-bonding postcard, the layout change setting is not permitted, so that the user cannot select the layout change in the "print setting screen". By this, the user cannot set the layout change in which there is a liability that the toner image to be formed on the pressure-bonding postcard so as not to be read from the outside is formed on the pressure-bonding postcard so as to be readable from the outside. The layout change is not set, and therefore, the layout change is not made during the preparation of the pressure-bonding postcard, so that the pressure-bonding postcard is appropriately prepared.

Incidentally, in the above-described first and second embodiments, the image forming systems 1X and 2X in which the pressure-bonding processing apparatus 200 is connected as a different casing to the apparatus main assembly of the image forming apparatus 100 were described as an example, but the pressure-bonding processing apparatus 200 may be provided inside the apparatus main assembly (inside the same casing) of the image forming apparatus 100. In that case, the main controller 101 also operates as the folding processing controller 430 and the pressure-bonding processing controller 630, which are described above.

Another Embodiment

Incidentally, in some cases, the image forming system includes a staple apparatus 800 as a retrofittable post-step unit. FIG. 13 shows an image forming system 2X including the staple apparatus 800. The image forming system 2X shown in FIG. 13 includes the staple apparatus 800, and the staple apparatus 800 is disposed downstream of the fixing device 8 with respect to the feeding direction of the recording material S.

<Staple Apparatus>

The staple apparatus 800 performs stapling for bundling and binding a plurality of sheets of the recording materials S discharged from the image forming apparatus 100. The staple apparatus 800 feeds the recording material S, discharged from the image forming apparatus 100, to a staple tray 802. In the case where the stapling is performed, the staple apparatus 800 causes a stapler 801 to operate every time when a predetermined number of sheets of the recording materials are stacked on the staple tray 802 and binds the recording materials, and then feeds the bound recording materials to the pressure-bonding processing apparatus 200. In the case where the stapling is not performed, the staple apparatus 800 does not cause the stapler 801 to operate, so that the staple apparatus 800 feeds the recording materials, discharged from the image forming apparatus 100, to the pressure-bonding processing apparatus 200 as they are.

<Print Setting Screen>

In the case where the image forming system 2X includes the staple apparatus 800, the user is capable of setting whether or not the stapling is performed, from the "print setting screen" displayed on the operating portion 700 or the external device. In FIG. 14, an example of the "print setting screen" is shown. In the "print setting screen" shown in FIG. 14, in addition to the original size, the output size, the number of copies, and the page layout, the user is capable of setting the stapling as "STAPLING/SORT". In this "print setting screen", in the case where "STAPLING+SORT" is selected in the item "STAPLING/SORT", setting for performing the stapling is made.

<Setting Control Processing>

However, conventionally, when the stapling is performed during the preparation of the pressure-bonding postcard, there was a liability that the bound recording materials S jam during feeding to the pressure-bonding processing apparatus 200. For that reason, there is a need that the stapling is not performed during the preparation of the pressure-bonding postcard. Therefore, in the constitution in which the image forming system 2X includes the staple apparatus 800, in the case where the stapling is set when setting for preparing the pressure-bonding postcard is made, the stapling may preferably be disabled during the preparation of the pressure-bonding postcard. In order to realize it, the above-described first embodiment is applied. Specifically, in the setting control processing (see, FIG. 10) in the first embodiment, processing in which the "layout change" is read as the "stapling" is carried out. That is, even when the stapling is set when the setting for preparing the pressure-bonding postcard is made (Yes of the SY2), the main controller 101 disables the stapling, so that the stapling is prevented from being performed (SY3).

By this, in the case where the stapling is set before execution of the operation in the pressure-bonding print preparation mode, the recording material S (pressure-bonding postcard sheet) is fed in the staple apparatus 800 without executing the stapling during the execution of the operation in the pressure-bonding print preparation mode. Thus, the stapling is not performed during the preparation of the pressure-bonding postcard and the recording material S is fed to the pressure-bonding processing apparatus 200 without being bound, so that in the pressure-bonding processing apparatus 200, it is possible to suppress a jam of the recording material S during the feeding. Accordingly, the pressure-bonding postcard is appropriately prepared.

Or, the above-described second embodiment may be applied. Specifically, in the setting control processing (see, FIG. 11) in the second embodiment, processing in which the "layout change" is read as the "stapling" is carried out. That is, in the case where in the "print setting screen", the user sets the "pressure-bonding postcard" as the output size (Yes of SY12), the main controller 101 does not permit the setting of the stapling, and the "print setting screen" is displayed so that the user cannot select the stapling (SY13). In this case, as shown in FIG. 14, for example, in the item "STAPLING/SORT", "STAPLING+SORT" is grayed out, so that the user is prevented from selecting the "STAPLING+SORT" from the options of the item "STAPLING/SORT". Incidentally, as a means other than the gray-out, a means such that the display of the "STAPLING+SORT" is caused to disappear or such that user selection is not received although the display of the "STAPLING+SORT" is normal display of the "STAPLING+SORT" may be employed.

Thus, at the time when the user sets the preparation of the pressure-bonding postcard, the setting of the stapling is not permitted, so that in the "print setting screen", the user is prevented from selecting the stapling. By this, the user cannot set the stapling in which there is a liability that the bound recording materials jam during the operation of the pressure-bonding processing apparatus. The stapling is set, and therefore, the stapling is not performed during the preparation of the pressure-bonding postcard, so that the pressure-bonding postcard is appropriately prepared.

Incidentally, when the constitution in which the above-described setting control processing is executed is employed, the controller for controlling the image forming systems 1X and 2X may be provided in any casing. For example, a constitution in which the controller for controlling entirety of the image forming systems 1X and 2X is the above-described main controller 101 or an external controller or a constitution in which the controller is provided inside of the apparatuses of the pressure-bonding processing apparatus 200 and executes the above-described setting control processing may be employed.

Thus, in the case where the pressure-bonding print is prepared, it is possible to suppress the influences of the layout change and the stapling.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145108 filed on Sep. 13, 2022, which is hereby incorporated by reference herein in its entirety.

What is claimed is:

1. An image forming system comprising:

an image forming apparatus including an image forming unit configured to form a toner image on a recording material having a pressure-sensitive adhesive layer on a surface thereof and a fixing unit configured to fix the toner image on the recording material;

a folding processing portion configured to fold the recording material, on which the toner image is fixed by the fixing unit, in a manner such that the surface where the pressure-sensitive adhesive layer is formed is an inside of the recording material;

a pressure-bonding portion configured to pressure-bond the recording material folded by the folding processing portion; and a setting portion capable of (1) selecting a pressure-bonding print preparation mode in which a pressure-bonding print is prepared by subjecting the recording material to pressure-bonding processing by the folding processing portion and the pressure-bonding portion and (2) selecting a layout of the toner image formed on the recording material, wherein the image forming system is configured such that in response to a state in which (1) the pressure-bonding print preparation mode is selected by the setting portion, (2) a first layout is selected as the layout by the setting portion, and (3) a controller determines that a user instruction to change the first layout to a second layout is received, the controller disables a layout change to the second layout, whereby an image formation is performed while maintaining the first layout, wherein the image forming system is configured such that in response to a state in which (1) the pressure-bonding print preparation mode is selected by the setting portion, (2) the first layout is selected as the layout, and (3) the controller determines that the user instruction to change the first layout to the second layout is not received, the image formation is performed in the first layout, and wherein (1) in a case in which a first image data is desired to be concealed, the first layout is a layout in which the first image data is formed on a paste surface of the recording material and would not be readable from outside of the pressure-bonding print, and the second layout is a layout in which the first image data is formed on a non-paste surface of the recording material and would be readable from outside of the pressure-bonding print, or (2) in a case in which a second image data is desired not to be concealed, the first layout is a layout in which the second image data is formed on a non-paste surface of the recording material and would be readable from outside of the pressure-bonding print, and the second layout is a layout in which the second image data is formed on a paste surface of the recording material and would not be readable from outside of the pressure-bonding print.

2. An image forming system according to claim 1, wherein the first layout is a layout in a 1 in 1 form in which the toner image is formed on one page of the recording material on the basis of image data of the one page.

3. An image forming system according to claim 1, further comprising a staple portion configured to subject the recording material to stapling;

wherein in a case that the pressure-bonding mode is selected by the setting portion, when the stapling is selected, selection of the stapling is eliminated.

4. An image forming system according to claim 1, further comprising a staple portion configured to subject the recording material to stapling, wherein in a case that the pressure-bonding mode is selected by the setting portion, when the stapling is not selected, change is made so that the stapling is incapable of being selected.

5. An image forming system according to claim 1, wherein the first layout is a layout in which the toner image is formed on one page of the recording material on the basis of image data of only one page, and wherein the second layout is a layout in which the toner image is formed on one page of the recording material on the basis of image data of plural pages.

6. An image forming system according to claim 1, wherein in a case where the controller disables the layout change to the second layout, the disabling ends after the image formation is performed while maintaining the first layout, at which time the layout change to the second layout is carried out.

7. An image forming system according to claim 1, wherein the first layout is a layout in which the first image data is formed on a paste surface of the recording material and would not be readable from outside of the pressure-bonding print, and the second layout is a layout in which the first image data is formed on a non-paste surface of the recording material and would be readable from outside of the pressure-bonding print.

8. An image forming system according to claim 1, wherein the first layout is a layout in which the second image data is formed on a non-paste surface of the recording material and would be readable from outside of the pressure-bonding print, and the second layout is a layout in which the second image data is formed on a paste surface of the recording material and would not be readable from outside of the pressure-bonding print.

9. An image forming system comprising:

an image forming apparatus including an image forming unit configured to form a toner image on a recording material having a pressure-sensitive adhesive layer on a surface thereof and a fixing unit configured to fix the toner image on the recording material;

a folding processing portion configured to fold the recording material, on which the toner image is fixed by the fixing unit, in a manner such that the surface where the pressure-sensitive adhesive layer is formed is an inside of the recording material;

a pressure-bonding portion configured to pressure-bond the recording material folded by the folding processing portion; and a setting portion capable of (1) selecting a pressure-bonding print preparation mode in which a pressure-bonding print is prepared by subjecting the recording material to pressure-bonding processing by the folding processing portion and the pressure-bonding portion and (2) selecting a layout of the toner image formed on the recording material, wherein the image forming system is configured such that in response to a state in which (1) a controller determines that the pressure-bonding print preparation mode is selected by the setting portion and (2) a first layout is selected as the layout by the setting portion, the controller prohibits the setting portion from changing the first layout to a second layout different from the first layout, and wherein (1) in a case in which a first image data is desired to be concealed, the first layout is a layout in which the first image data is formed on a paste surface of the recording material and would not be readable from outside of the pressure-bonding print, and the second layout is a layout in which the first image data is formed on a non-paste surface of the recording material and would be readable from outside of the pressure-bonding print, or (2) in a case in which a second image data is desired not to be concealed, the first layout is a layout in which the second image data is formed on a non-paste surface of the recording material and would be readable from outside of the pressure-bonding print, and the second layout is a layout in which the second image data is formed on a paste surface of the recording material and would not be readable from outside of the pressure-bonding print.

10. An image forming system according to claim 9, wherein the second layout is grayed out in a user interface, whereby a user is prevented from selecting the second layout from the user interface.

11. An image forming system according to claim 9, wherein the controller prohibits the setting portion from changing the first layout to the second layout by controlling a user interface such that a user is not permitted to instruct changing to the second layout.

12. An image forming system according to claim 9, wherein the first layout is a layout in which the toner image is formed on one page of the recording material on the basis of image data of only one page, and wherein the second layout is a layout in which the toner image is formed on one page of the recording material on the basis of image data of plural pages.

13. An image forming system according to claim 12, wherein the second layout is a layout in which the toner image is formed on one page of the recording material on the basis of image data of exactly two pages.

14. An image forming system according to claim 9, wherein the user interface displays (a) a message identifying the pressure-bonding mode and (b) a list of a plurality of layouts including the first layout and the second layout, with the second layout grayed-out.

15. An image forming system according to claim 14, wherein the first layout is a layout in which the first image data is formed on a paste surface of the recording material and would not be readable from outside of the pressure-bonding print, and the second layout is a layout in which the first image data is formed on a non-paste surface of the recording material and would be readable from outside of the pressure-bonding print.

16. An image forming system according to claim 14, wherein the first layout is a layout in which the second image data is formed on a non-paste surface of the recording material and would be readable from outside of the pressure-bonding print, and the second layout is a layout in which the second image data is formed on a paste surface of the recording material and would not be readable from outside of the pressure-bonding print.

17. An image forming system according to claim 9, wherein the first layout is a layout in which image data of a page is formed on a paste surface of the recording material and would not be readable from outside of the pressure-bonding print, and the second layout is a layout in which the image data of the page is formed on a non-paste surface of the recording material and would be readable from outside of the pressure-bonding print.

18. An image forming system according to claim 9, wherein the first layout is a layout in which image data of a page is formed on a non-paste surface of the recording material and would be readable from outside of the pressure-bonding print, and the second layout is a layout in which the image data of the page is formed on a paste surface of the recording material and would not be readable from outside of the pressure-bonding print.

* * * * *